United States Patent
Stallard et al.

(12) 
(10) Patent No.: US 6,275,751 B1
(45) Date of Patent: Aug. 14, 2001

(54) SMART DOCKING SURFACE FOR SPACE SERVICEABLE NANO AND MICRO SATELLITES

(75) Inventors: Michael Stallard, Corrales, NM (US); Michael Obal, Woodbridge, VA (US); Alok Das, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/550,582

(22) Filed: Apr. 17, 2000

(51) Int. Cl.$^7$ .................................................. G06F 17/00
(52) U.S. Cl. ................... 701/13; 701/1; 701/3; 342/61; 342/62; 244/161; 244/166; 244/164; 244/171
(58) Field of Search .................. 701/13, 1, 3; 342/61, 342/62; 244/161, 164, 166, 171

(56) References Cited

U.S. PATENT DOCUMENTS

| | | | |
|---|---|---|---|
| 4,657,211 | * | 4/1987 | Fuldner et al. ........................ 244/161 |
| 4,903,919 | * | 2/1990 | Johnson et al. ....................... 244/161 |
| 5,734,736 | * | 3/1998 | Palmer et al. ......................... 382/103 |

* cited by examiner

*Primary Examiner*—William A. Cuchlinski, Jr.
*Assistant Examiner*—Yonel Beaulieu
(74) *Attorney, Agent, or Firm*—Kenneth E. Callahan

(57) ABSTRACT

A smart docking surface consisting of closely spaced cantilevered sensor/actuator structures capable of precisely repositioning an object having a ferro-magnetic surface in contact with the smart docking surface. It is designed for use in a micro gravity environment for the final docking sequence of two small (<100 kg) satellites. Its purpose is to reduce the complexity of the docking process where a precise mating is required.

5 Claims, 17 Drawing Sheets

| Typical performance for a single element | | | | | |
|---|---|---|---|---|---|
| | | DC Voltage State | Cantilever Bending Generated | Eddy current sensor contact | Tip Magnet State |
| $a_{ijkl}$ | — | j | (+/−) | | — |
| | 1 to n | 1 | +Z | k | 1 or 2 |
| | | 2 | −Z | 1 or 2 | |
| $b_{ijkl}$ | — | j | (+/−) | | — |
| | 1 to n | 1 | +Y | k | 1 or 2 |
| | | 2 | −Y | 1 or 2 | |

$a_{ijkl}$ } Z direction bending actuators $b_{ijkl}$ } Y direction Benders actuators i element number (1 to n)
j surface number (1, 2)
k eddy current tip sensor signal (1 contact, 2 no contact)
l magnet state (1(on), 2(off))

Example: $a_{9121}$ actuator #9 bending in the +Z direction, no eddy current surface contact and it's tip magnet is off

*Fig. 10*

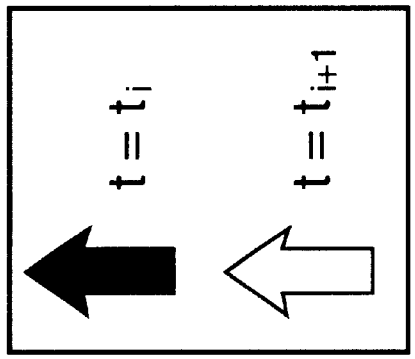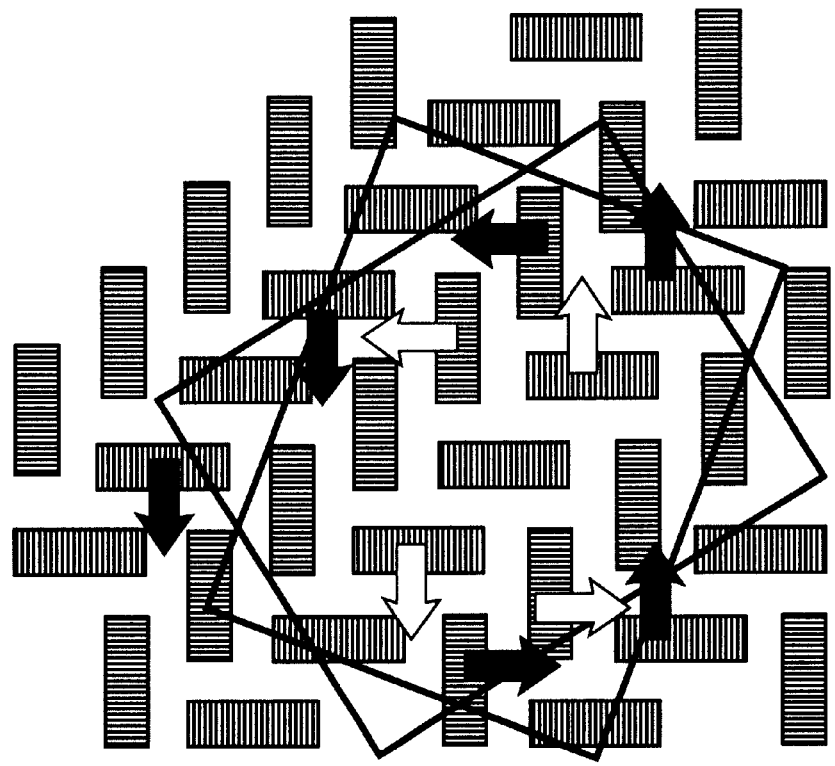
Fig. 14

SMART DOCKING SURFACE FOR SPACE SERVICEABLE NANO AND MICRO SATELLITES

STATEMENT OF GOVERNMENT INTEREST

The invention described herein may be manufactured and used by or for the Government for governmental purposes without the payment of any royalty hereon.

BACKGROUND OF THE INVENTION

1. Field of the Invention

This invention is in the field of spacecraft docking systems for nano and micro spacecraft, and in particular permits final precision docking maneuvers to be accomplished in a non-precision manner.

2. Description of the Prior Art

To accomplish precision docking of spacecraft in a micro gravity environment involves the application of highly sophisticated navigation and docking processes. In a satellite servicing mission, a nano (under 10 kg) or a micro (under 100 kg) satellite autonomously docks with a larger satellite and mates with an external electrical/mechanical connector to provide a replacement or upgraded component. Traditional docking mechanisms are small latching devices that require the nano-/micro-satellite to precisely locate and engage the mechanism on the target satellite, placing a tremendous burden on the guidance, navigation, and homing functions of the nano-/micro-satellite. An alternative approach is to provide a large docking area on the target or "Receiver" spacecraft (RSC) to which the "Servicer" spacecraft (SSC) can attach, thus minimizing the guidance requirements for the SSC. This large docking patch or its mate is active, so that it can manipulate and reposition the SSC to the exact location required to engage the electrical/mechanical/fluid connectors to effect the service/replacement/upgrade function.

Several satellite applications of micro-miniature active attachment mechanisms are envisioned for future systems. In a satellite servicing mission, the nano-/micro-satellite might have robotic capabilities and will require attachments which allow it to move about on the host satellite. These attachments (on its feet, for example) must allow attachment, restraint during robot locomotion, and detachment. One approach is evocative of a caterpillar, in which the robot's feet always maintain positive attachment, but are comprised of many active elements that propel the robot.

In some surveillance missions, large deployable structures (such as antennas) are required, and once deployed their shape precisely achieved and maintained. A deployable antenna could consist of segments (like the petals of a flower) which unfurl and attach along their edges to form a dish-like shape. If the edge attachments were active, they could allow small adjustments of the captured position of the mating edges and provide a more accurate deployed shape.

"Smart" attachments are devices that allow two parts to attach and detach, but also effect the relative motion of the two parts (either automatically or on command) while maintaining attachment. It is envisioned that these devices might consist of thousands of miniature attachments (hooks, for example) which are active using smart materials or micro-actuators.

This particular invention focuses on the autonomous precision docking of spacecraft using a non-precision approach, thereby alleviating the requirement for complex and costly satellite navigation and control systems. This invention, however, does not relieve the two spacecraft planning to dock of the requirement to employ sophisticated navigation system to rendezvous locally (<1 meter) via orbital maneuvers. The invention requires that the two spacecraft can be maneuvered in such a manner that the SSC transfer surface contacts the RSC "Smart Docking Surface" (SmDS) in a soft non-impact manner and with a relatively small angular misalignment to the normal of the "smart" surface. The benefit of this invention comes primarily from the relaxation of the Y, Z and Roll coordinate degrees of freedom precision maneuver requirements of the two docking spacecraft. The coordinates are defined in FIG. 1

Relaxation of X, Y and $\phi$ degrees-of-freedom precision docking requirements leads to a simplified and more robust spacecraft docking control system. This invention creates a new and novel way to dramatically decrease the complexity of the docking processes which enhances the overall spacecraft system design by allowing for less overall spacecraft resources (power, propulsion fuel, computational load) to be allocated for docking events.

Applications for "Servicer" nano and micro satellites include: providing satellite electronics system upgrades and repairs of DoD space assets; replenishment of cryogenics cooling fluids for IR based sensors and/or cryo-electronics satellite subsystems; replenishment of chemical reactants fuels for space based laser weapon systems; and attachment of de-orbit systems to satellites that cannot de-orbit themselves.

SUMMARY OF THE INVENTION

The present invention creates a novel way to provide a high-precision low-cost final docking approach for nano and micro spacecraft. This invention will allow the two docking spacecraft to complete final precision docking maneuvers in a non-precision manner using a multi-step approach. To accomplish precision space docking in a non-precision manner this invention uses a "Smart Docking Surface" (SmDS) on the receiving spacecraft. This SMDS consists of closely spaced cantilever sensor/actuator structures that: a) hold the two spacecraft together; b) reposition the two spacecraft with respect to each other in a precise manner; c) allow for other mechanisms to attach the spacecraft together for the transfer of loads, thermal energy, electrical energy and fluids in the vacuum and micro gravity space environment; and d) provide for disengagement of the two spacecraft.

BRIEF DESCRIPTION OF THE DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

FIG. 10 provides an element labeling scheme and the bending directions given an applied voltage polarity.

FIG. 14 shows rotation about the roll of the SSC.

DESCRIPTION OF THE PREFERRED EMBODIMENT

Figure 1:
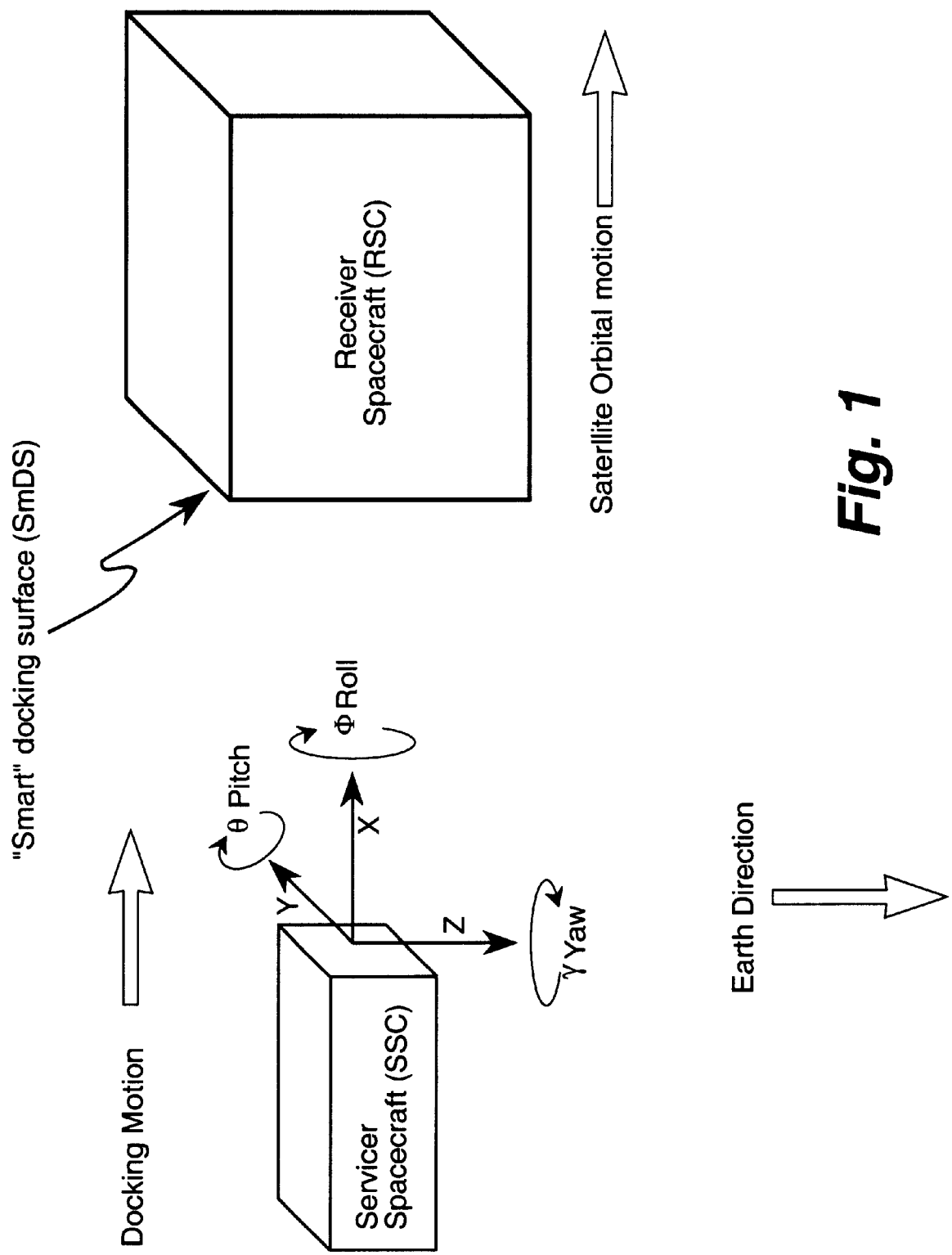
FIG. 1 defines the coordinate system involved in the docking of two spacecraft.
Figure 2:
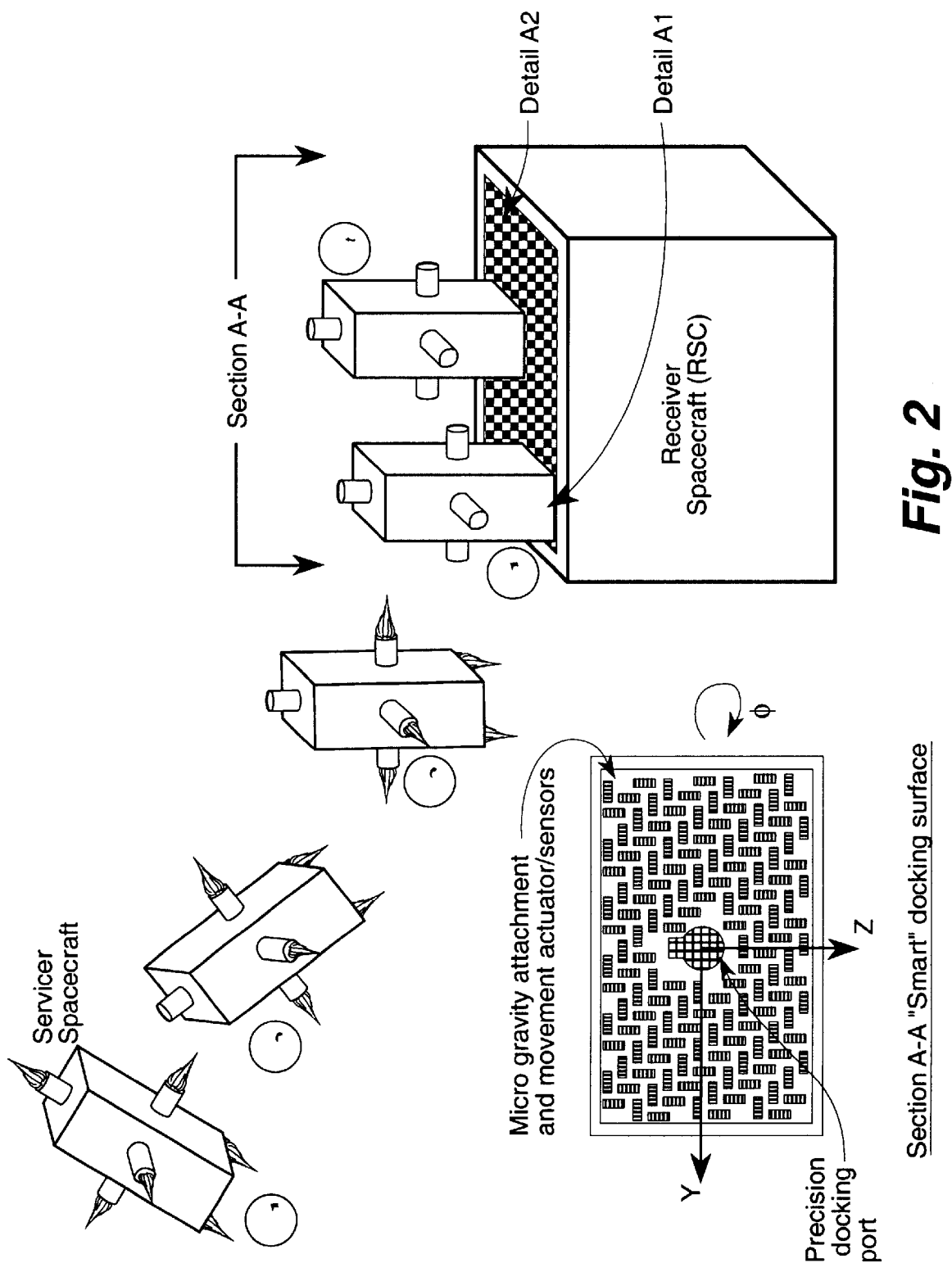
FIG. 2 depicts a docking process using the SmDS.

The coordinate system for the servicing and receiving spacecraft is shown in FIG. 1. The typical docking process envisioned using this invention is depicted in FIG. 2. The "Servicer" spacecraft (SSC) approaches the "Receiver" Spacecraft (RSC) using a multitude of complex maneuvers (steps 1–3) to align its contact surface with the RSC "Smart Docking Surface" (SmDS). The SSC lightly contacts (step 4) the RSC SmDS within the prescribed impact load conditions dictated by the shock absorbing capabilities of the SmDS sensor/actuator elements and angular misalignment between the SSC and RSC planar surfaces. Each of the RSC SmDS elements can sense the SSC via eddy current sensors and hold the SSC's ferro-magnetic material docking surface to the RSC (FIG. 3, Detail A1) using their tip electromagnets. Prior to initial contact, all the elements on the SmDS have their electromagnetic tips activated to capture the SSC. After capture, the SmDS control computer identifies the location and orientation of the SSC by alternatively cycling each sensor actuator electromagnet off and then on after reading its eddy current tip probe. The eddy current probe output is affected by the magnetic field produced by the close proximity electromagnet tip and therefore must be read with the tip electromagnet off. After assessing the location and orientation of the SSC the SmDS, it then autonomously repositions (step 5) the SSC in such a manner as to align the SSC and RCS precision ports for final docking.

Figure 3:
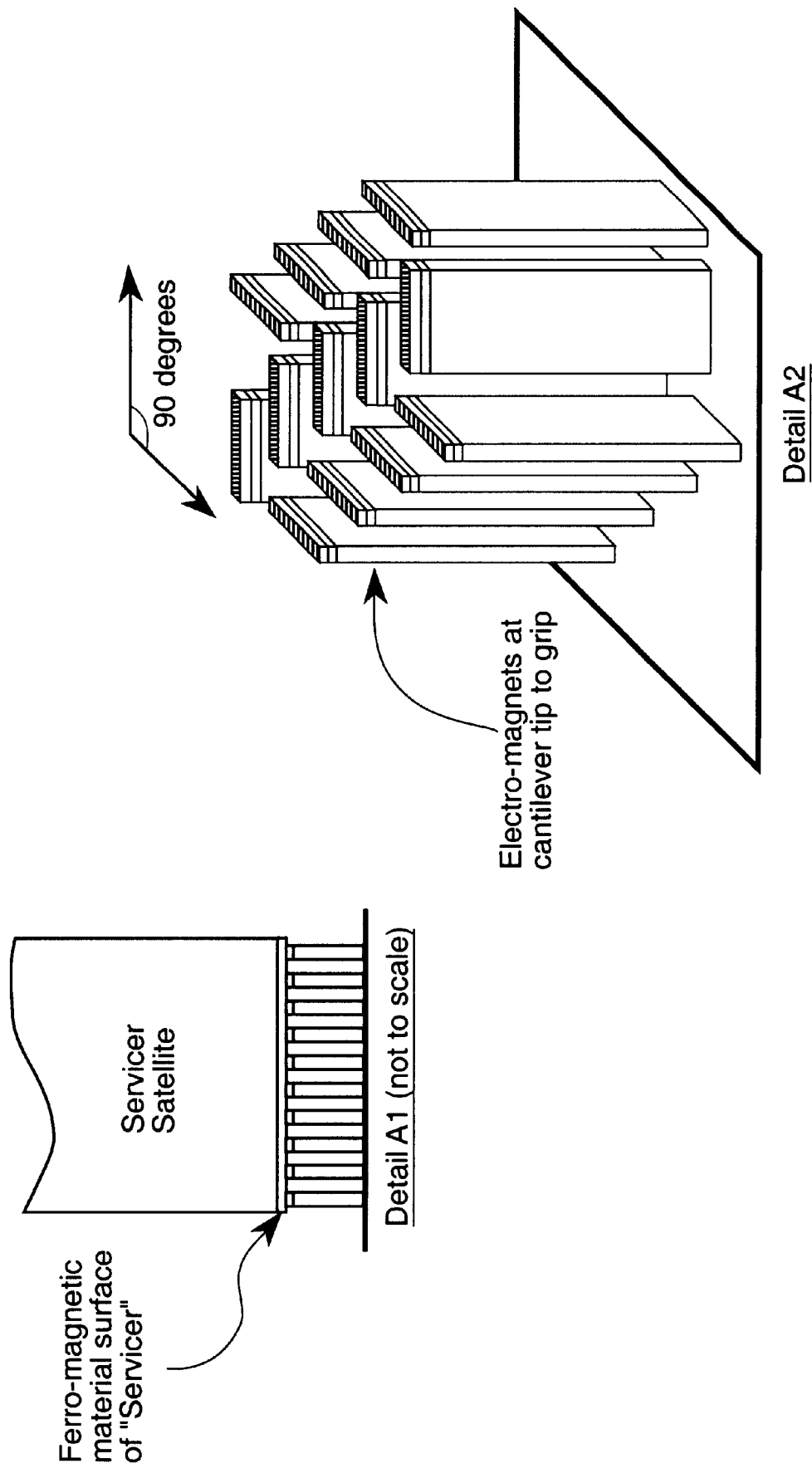
FIG. 3 shows details of the Smart Docking Surface's sensor/actuator cantilevered beam elements.

The RSC has a SmDS area that consists of identical sensor/actuator cantilevered beam elements mounted in a perpendicular (herringbone) pattern arrangement as shown in FIG. 2 section A—A and FIG. 3 Detail A2. The tips of the identical sensor actuator elements form a planar surface with a variation element height difference not to exceed 0.1 mm. Each beam element can bend in either the Y or Z direction. Using these elements the SSC can be moved along the SMDS in the Y and Z direction as well as be rotated about the SSC's roll (φ) coordinate. In the particular coordinate system defined, the positive φ rotation is clockwise about the X coordinate. The number of sensor/actuator elements is dependent upon the available "Smart" surface area.

Figure 4:
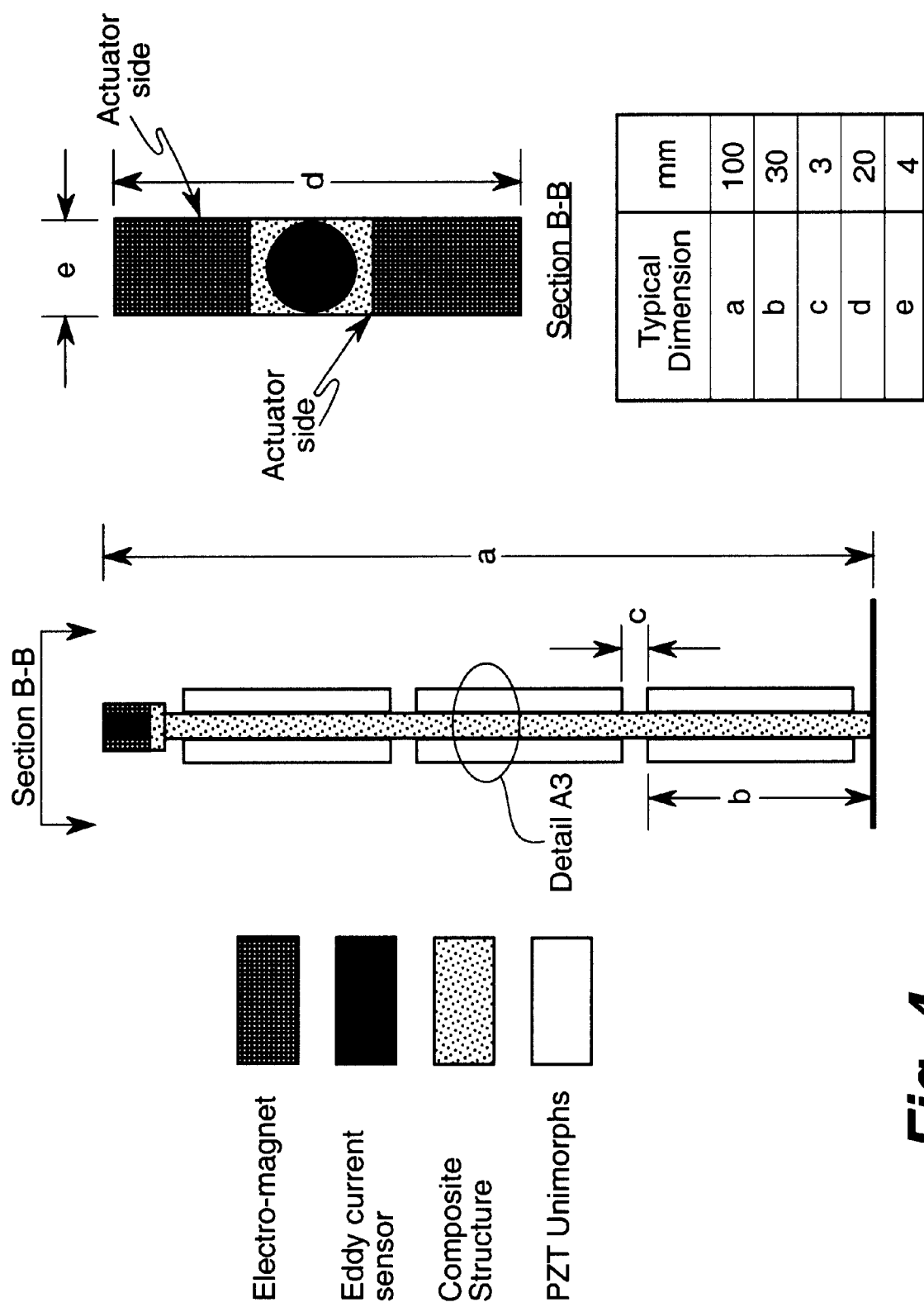
FIG. 4 shows details of the cantilevered sensor/actuator elements.
Figure 5:
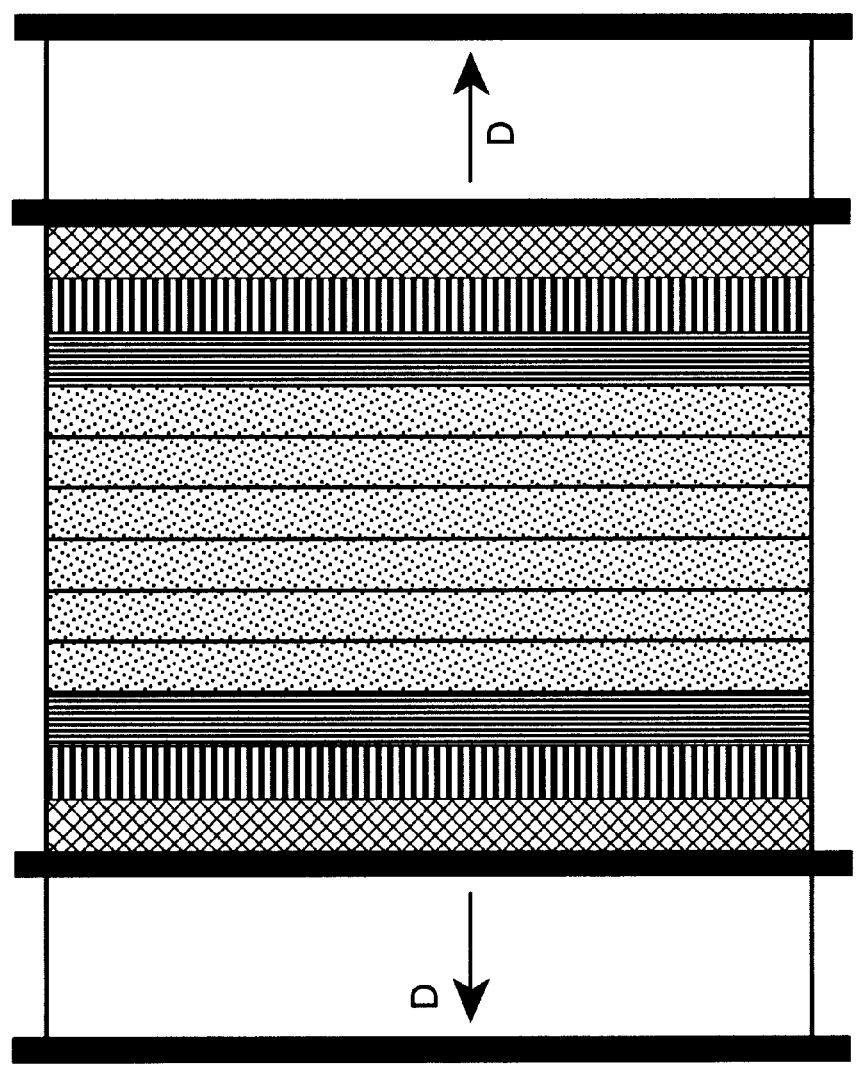
FIG. 5 shows details of the PZT ceramic unimorph.
Figure 6:
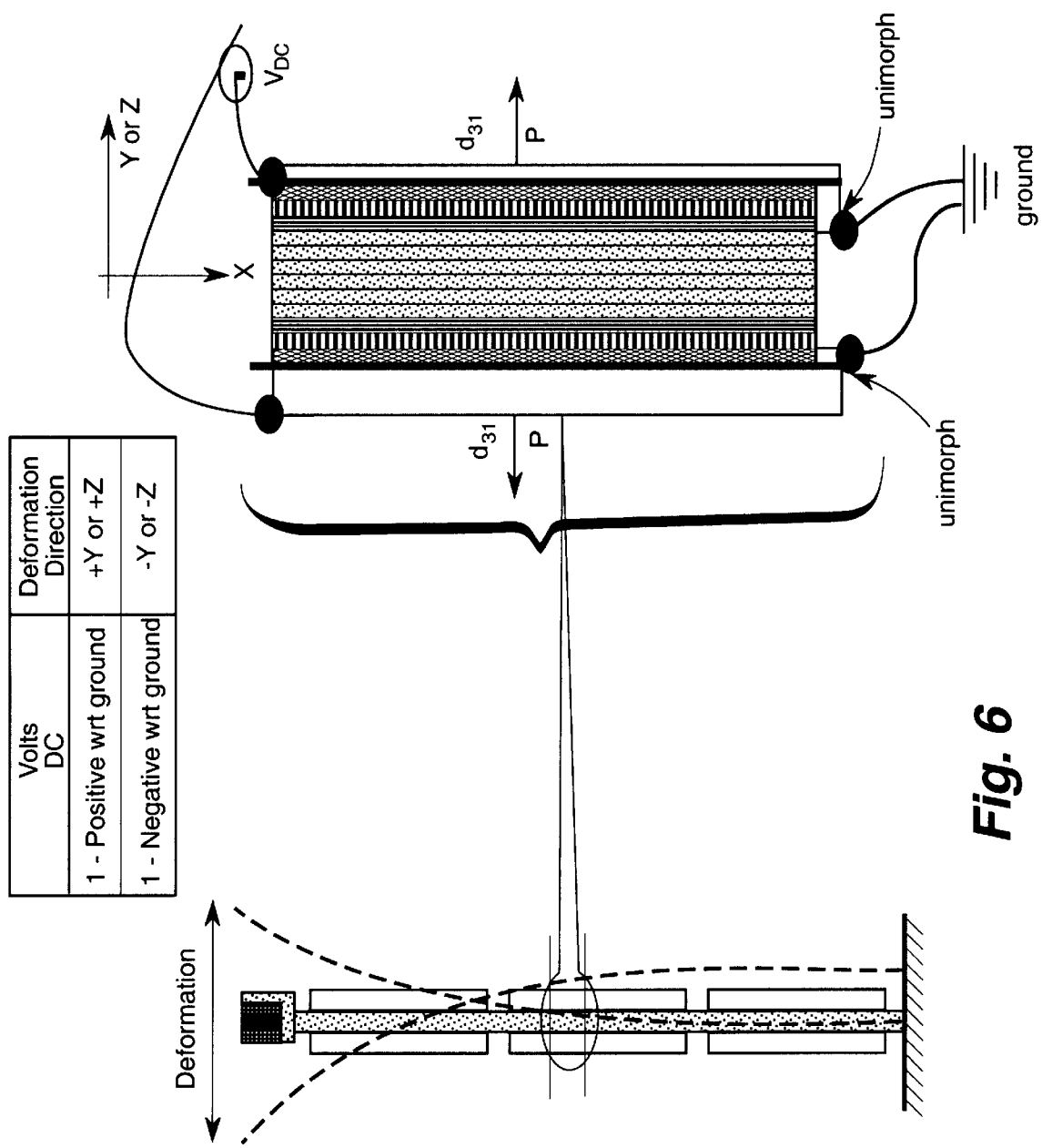
FIG. 6 is a wiring diagram for an individual actuator element.
Figure 7:
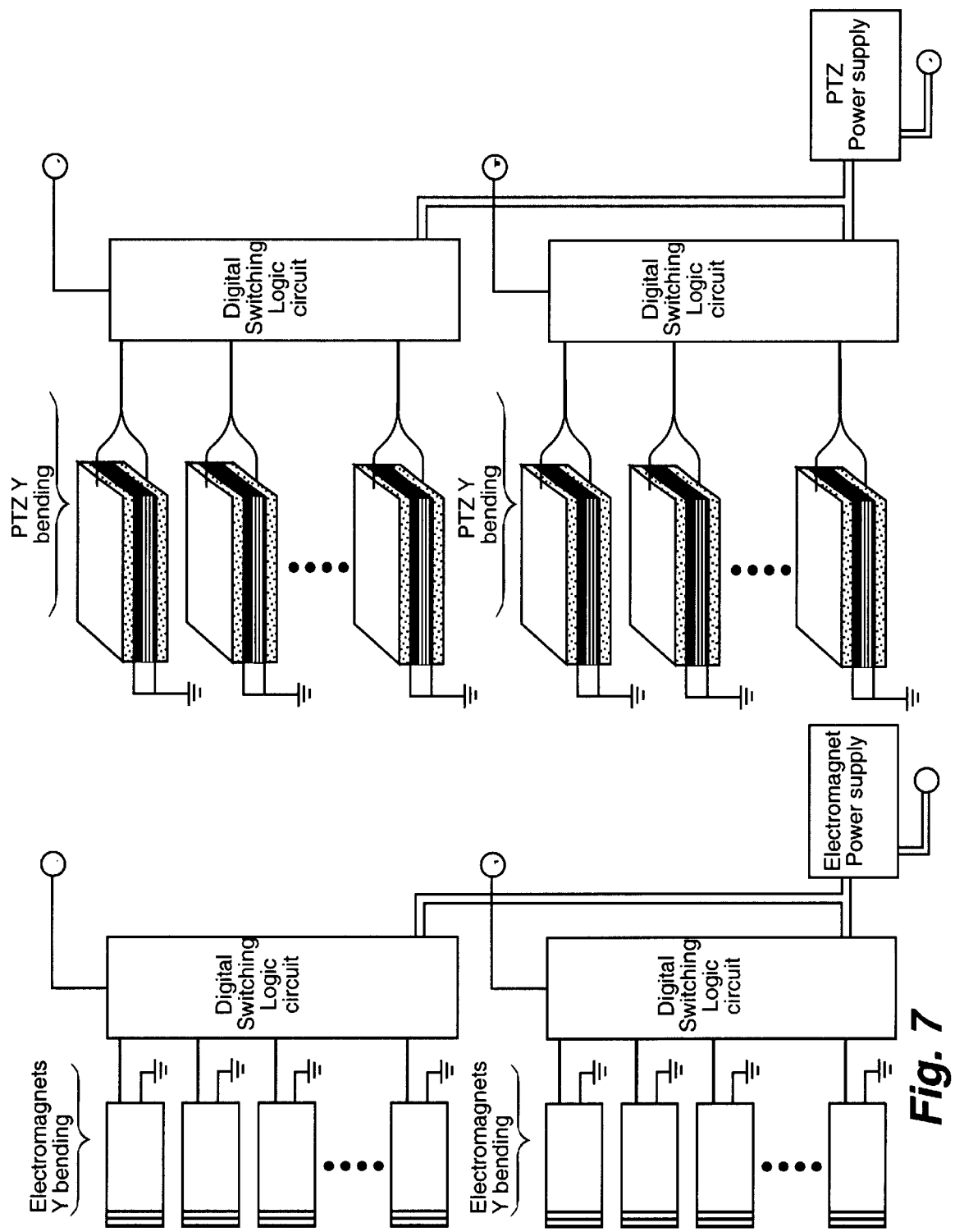
FIG. 7 is a wiring block diagram for the sensor/actuator elements.
Figure 8:
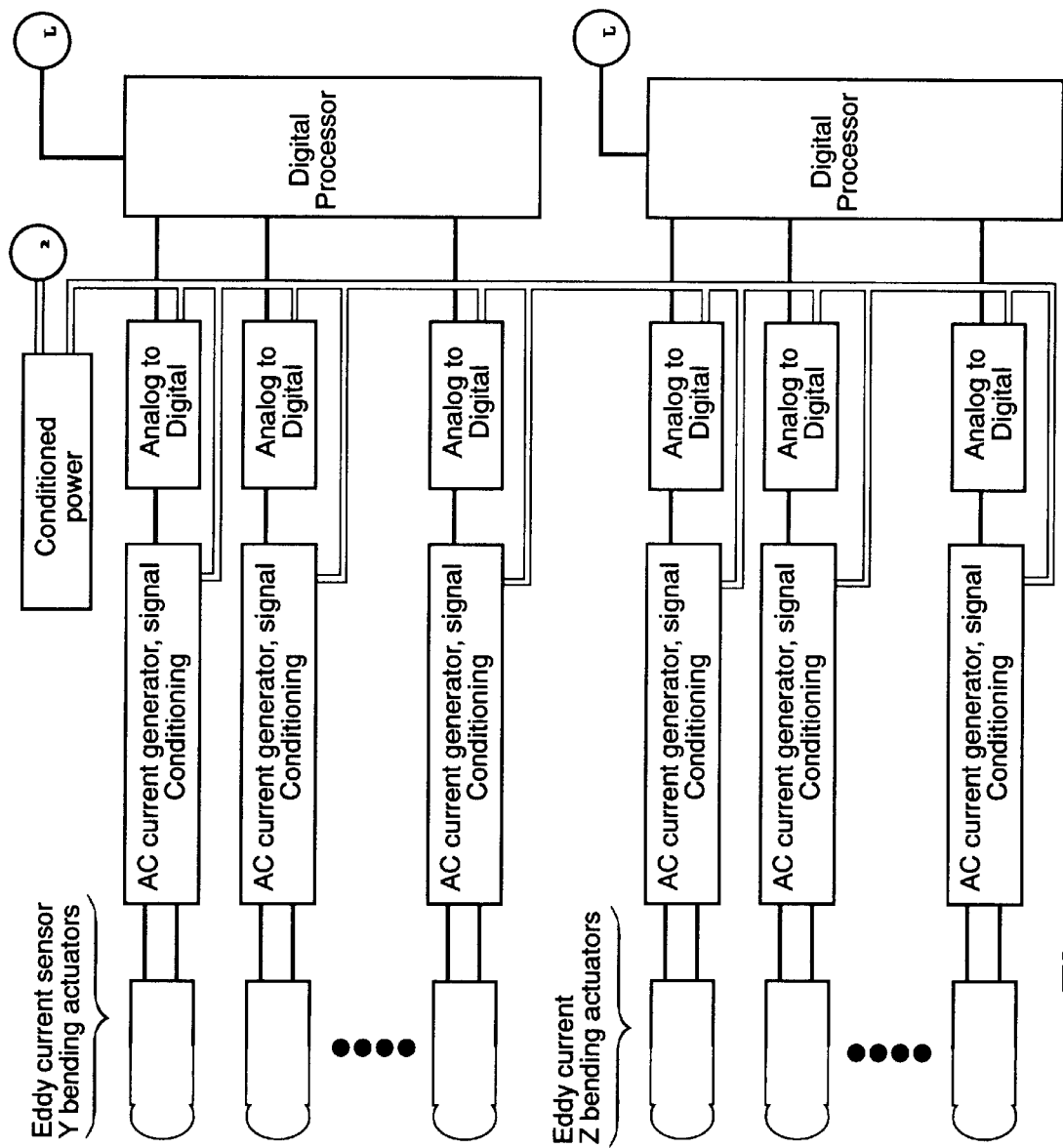
FIG. 8 shows additional details for the wiring block diagram of FIG. 7.
Figure 9:
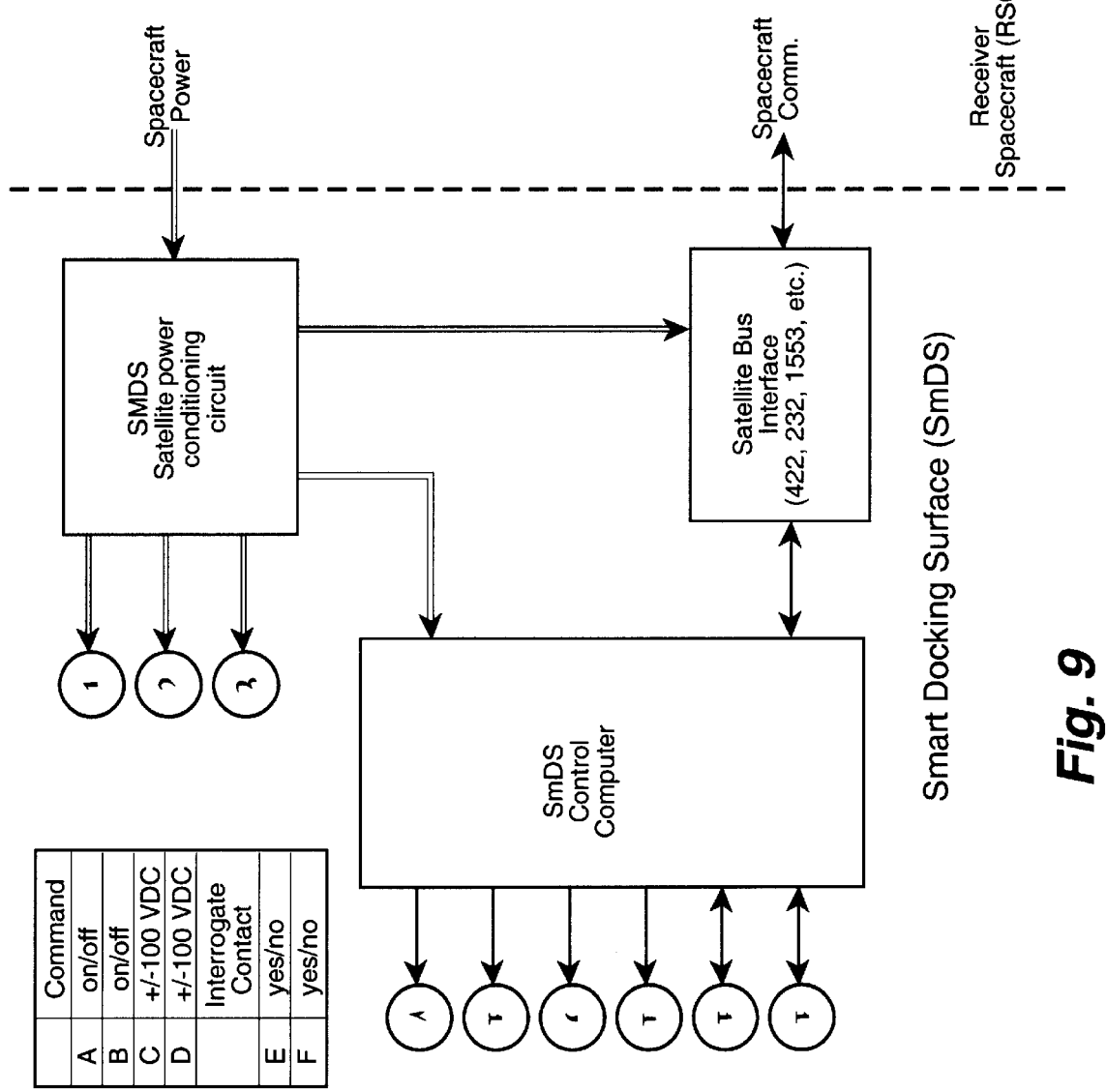
FIG. 9 is an overview of the control system.

Each sensor/actuator element is identical. The element consists of a multi-layered cantilevered structure shown in FIGS. 4, 5 and 6. Each element structure is attached to the base of the RSC and has an electromagnet and eddy current probe attached to its tip. The electromagnet is activated to hold on to the ferro-magnetic contact surface of the SSC. The eddy current probe enables the RSC to locate the SSC on the SmDS. The structural design consists of a six-ply composite laminate beam with sample dimensions as shown in FIG. 4. Each side of the cantilever is covered by a layer of copper/polyimide film with embedded conductors, insulator film, epoxy adhesive, and piezoelectric lead zirconate titanate (PZT) ceramic unimorphs as shown in FIGS. 4 and 5. The PZT unimorphs are polarized perpendicular to the sensor/actuator element as shown in FIG. 5 and the unimorphs. The conductors in the copper/polyimide film provide power to the tip eddy current sensor, electromagnet, and the PZT unimorphs. The conductor copper/polyimide film also provides for a signal return from the eddy current sensor.

PZT material was chosen because of its space durability and wide temperature operating range. Other materials such as Shape Memory Alloys and electrostrictive materials could also be used. These materials deform under applied electric current and/or voltage and are suitable for bending the actuators. The choice of PZT or any of these other classes of materials is primarily dependent on the temperature variability of the material in its application, desired displacement, ease of manufacturing, cost and power available. PZT was chosen for this particular concept because it appeared to have a good balance of these design parameters.

When wired appropriately, (details shown in FIGS. 6,7, 8,9) the beam element can be deformed in a manner that allows the tip to displace relative to the base of the element. When a DC voltage is applied to the PZT material polarized as shown in FIG. 5, the $d_{31}$ piezoelectric constant dominates the behavior of the material such that the material will contract or expand primarily in X direction (parallel to the element). The adhesive bond on one side of the PZT unimorph will restrict it from displacing thus imparting a surface stress load to the composite beam. This will cause in the first order sense, a set of opposing moments at the ends of the PZT unimorphs. These couples will bend the beam in either the Y or Z directions as define by the local coordinate system. This bending will cause the tip of the cantilever to displace and depending on how the element is mounted on the "Smart" surface, the element tip deformations will be in either the +/−Z or Y directions with a slight contraction (−X direction). FIG. 10 provides for an element labeling scheme as well as the bending directions, given an applied voltage polarity. When the voltage is reversed the element will bend in the opposite direction. Appendix A details the derivation of governing equations of this actuator structure and provides performance estimates of deformation versus DC voltage applied.

Figure 11:
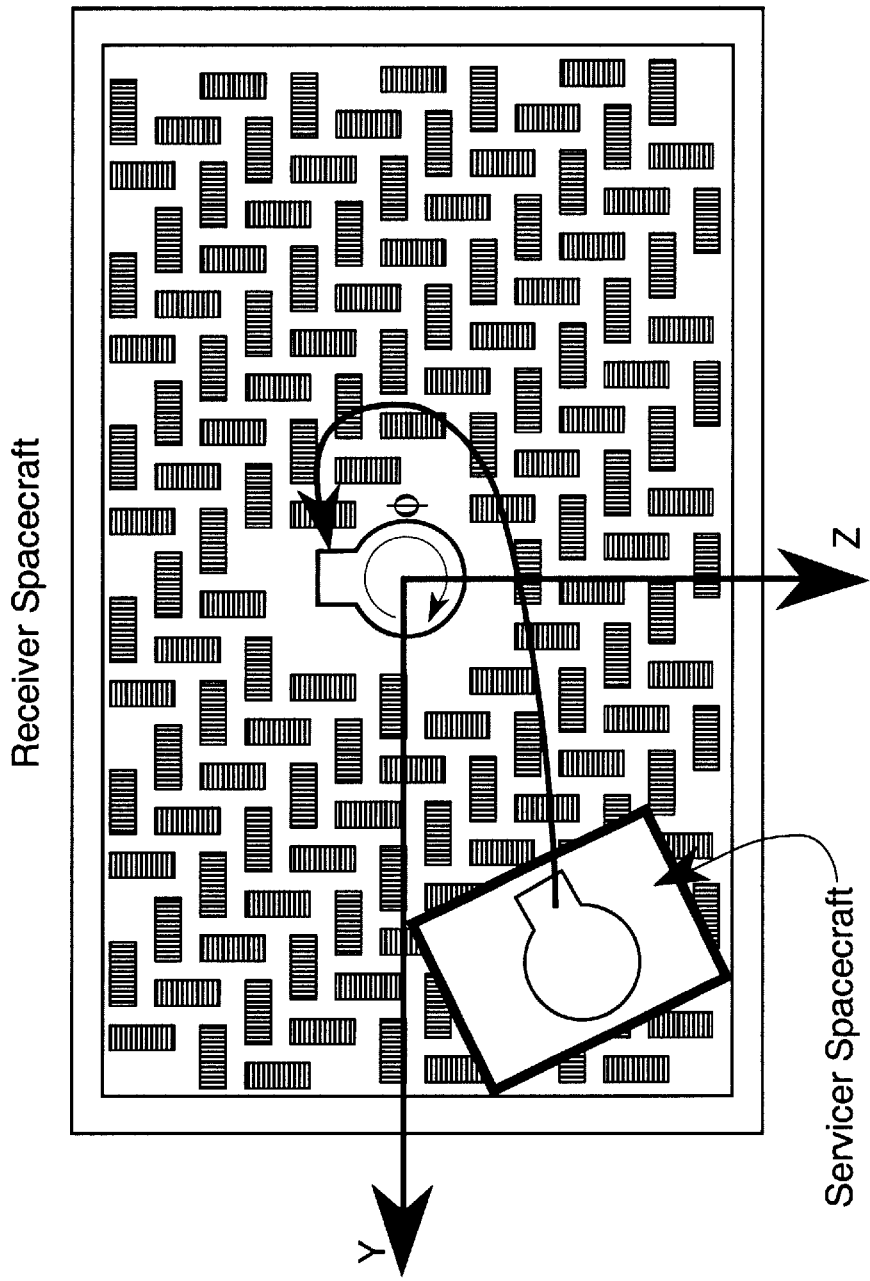
FIG. 11 shows a contact position of a SSC relative to the desired position on the RSC.

FIG. 11 depicts a SSC docking situation where the SSC and RSC precision docking ports are not in alignment. The SmDS's job is to move and reposition the SSC in such a manner that the two precision docking ports align and the final docking/mating sequence can be executed. To this end, the SmDS must move the SSC along the Y and Z plane as well as rotate it about the X-axis. All of this is assumed to be done on a three-axis stabilized RSC exhibiting no inertial loads in a micro-gravity environment. It is also required that the RSC have sufficient inertial control capability to maintain stability when contact and coupling between the two spacecraft occurs.

The motion of the SSC across the SmDS is done in a step wise manner as not to rapidly change the overall inertial configuration of the two couple spacecraft causing a potential stability control issue for the RSC. The RSC checks and stabilizes the couple spacecraft prior to each displacement event of the SSC. This process also requires the SSC to deactivate any inertial and/or propulsive devices within its system once contact with the SmDS surface has occurred.

Figure 12:
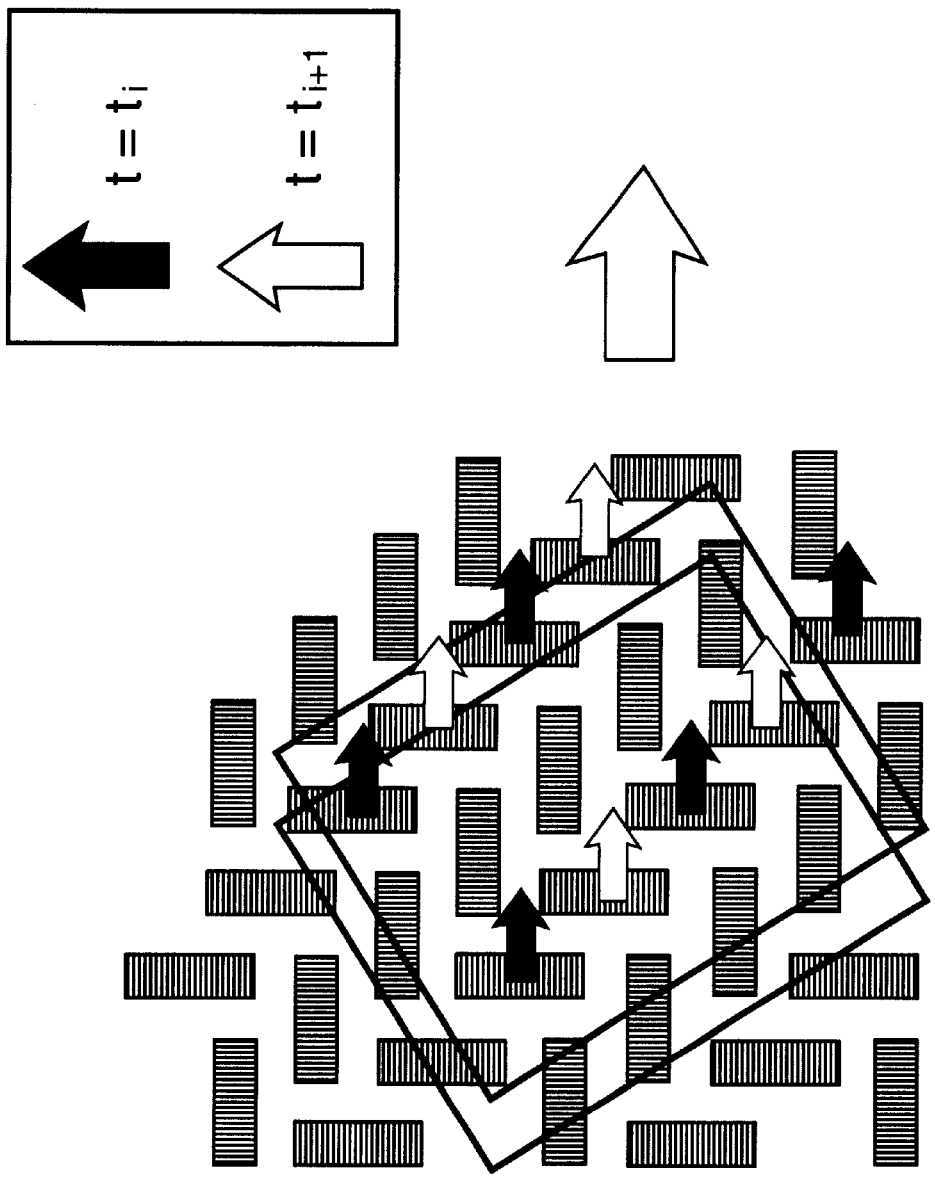
FIG. 12 shows movement in the −Y direction by the SSC.
Figure 13:
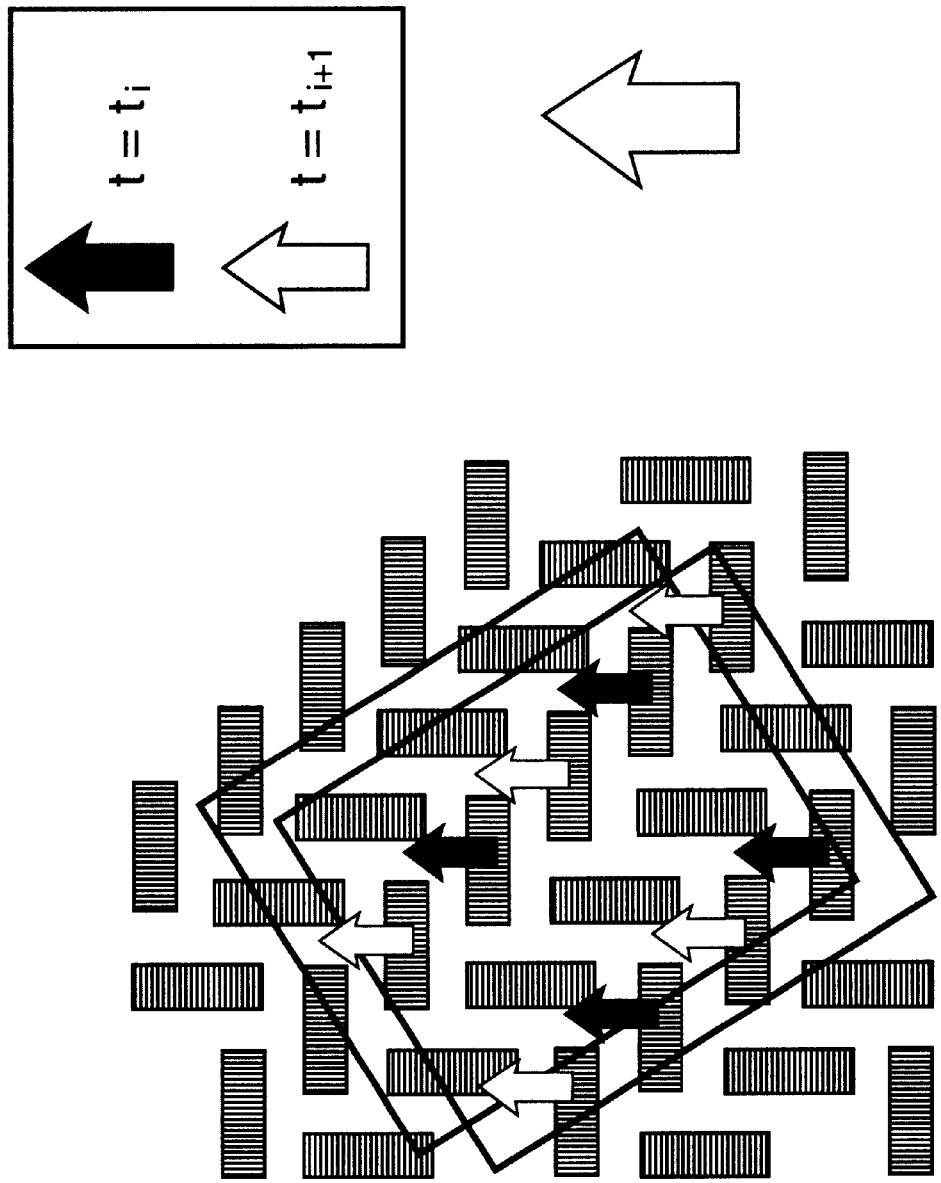
FIG. 13 shows movement in the −Z direction by the SSC.
Figure 15:
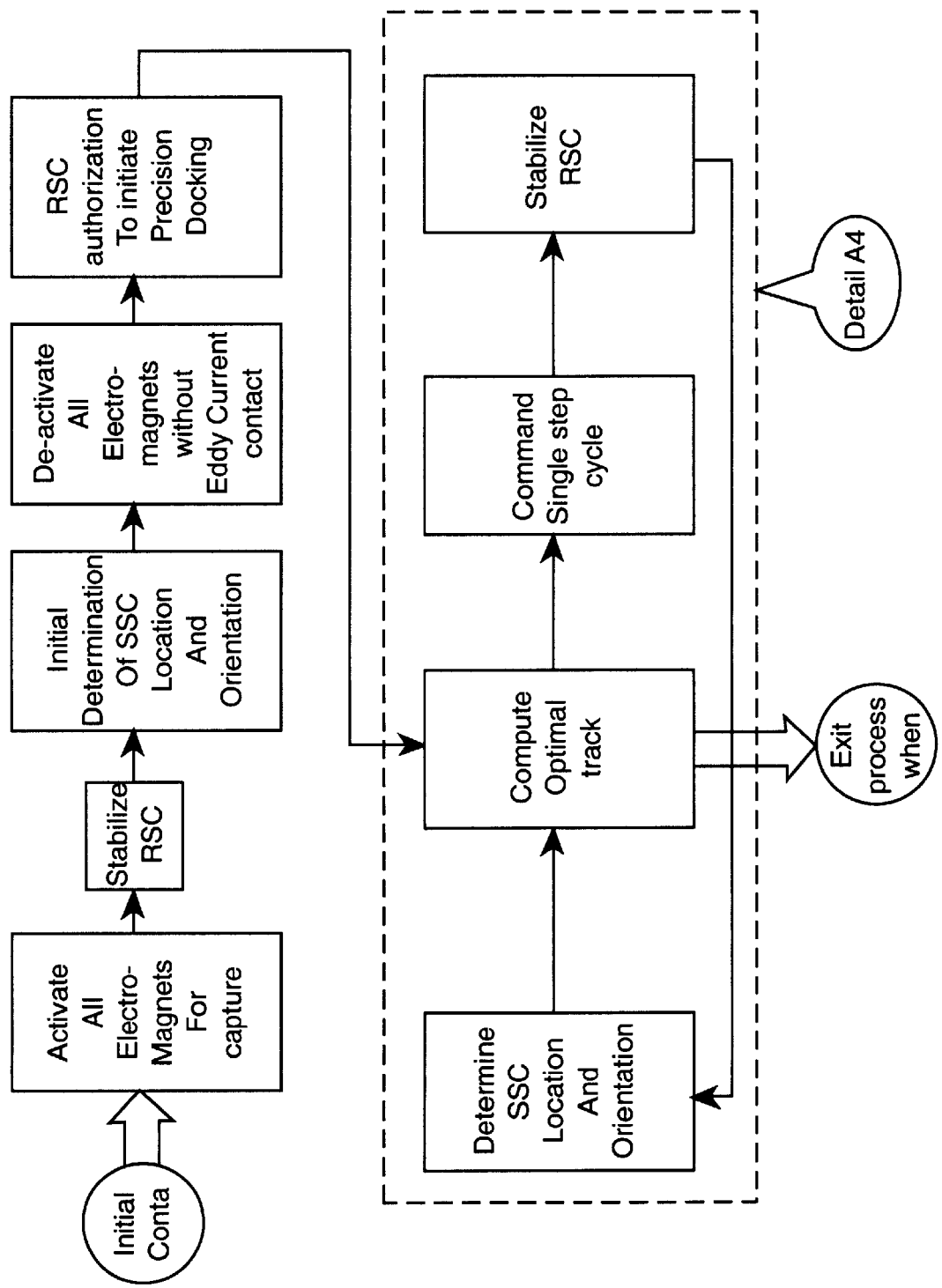
FIG. 15 is the control system logic diagram.
Figure 16:
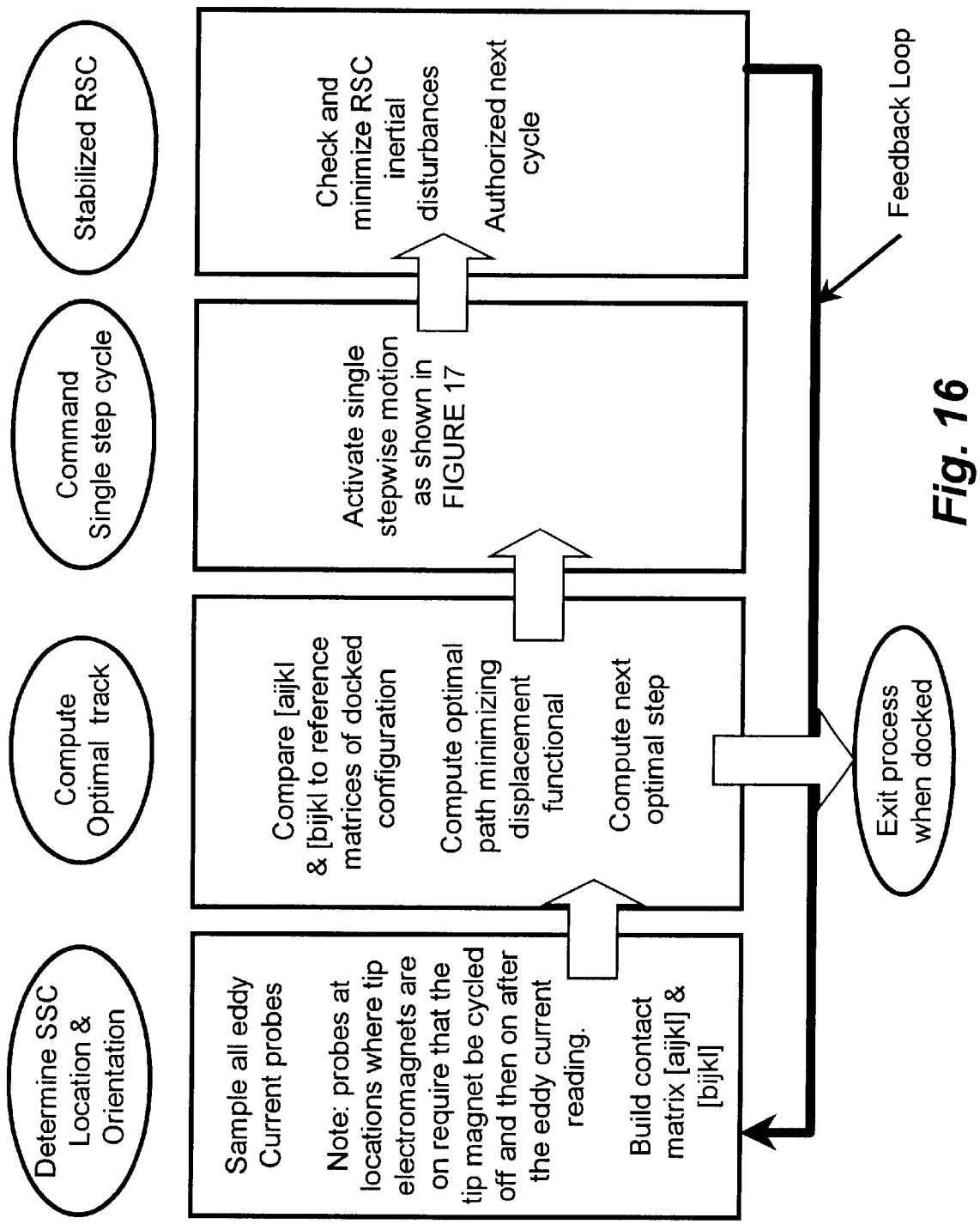
FIG. 16 shows the optimal SSC docking control block diagram.

FIGS. 12,13 and 14 demonstrate how the PZT driven cantilever bending elements can move and rotate the SSC to exactly fit in the RSC precision port. A control system level description and flow diagrams are shown in FIGS. 15 and 16.

FIGS. 11, 12, 13 and 14 diagram the manner in which the SSC is moved across the SmDS surface. The process is as follows. The SSC is first captured by the RSC by turning on the all the magnets. As the SSC is captured, the SSC's control subsystem is placed in an inert state, and the RSC control system adjusts to the impulse change to its inertial configuration and stabilizes the coupled SSC and RSC system. When the RSC has obtained a new stable inertial configuration all inertial loads on the two spacecraft coupled configuration should be quiescent.

The SmDS computer identifies the location and orientation of the SSC relative to the RSC precision docking port by sampling all of the eddy current tip sensors on the SmDS and computes the optimal planned displacement track to move the SSC to the RSC precision coupling port. As mentioned above, the SmDS control computer identifies the location and orientation of the SSC by alternatively cycling each sensor actuator electromagnet off and then on after reading its eddy current tip probe. The eddy current probe output is affected by the magnetic field produced by the close proximity electromagnet tip and therefore must be read with the tip electromagnet off. After the optimal track is determined, the SmDS deactivates all electromagnets that are not in contact with the SSC surface. After RSC flight control computer authorization to proceed, the SmDS computer then executes the docking algorithm that controls the voltage power element distribution circuitry that applies voltages to selected elements required to move and rotate the SSC to its final position. Continuous position feedback is obtained from the eddy current sensors and this information is used as input to the SmDS computer. FIGS. 15 and 16 diagrams out the computer software control logic.

Figure 17:
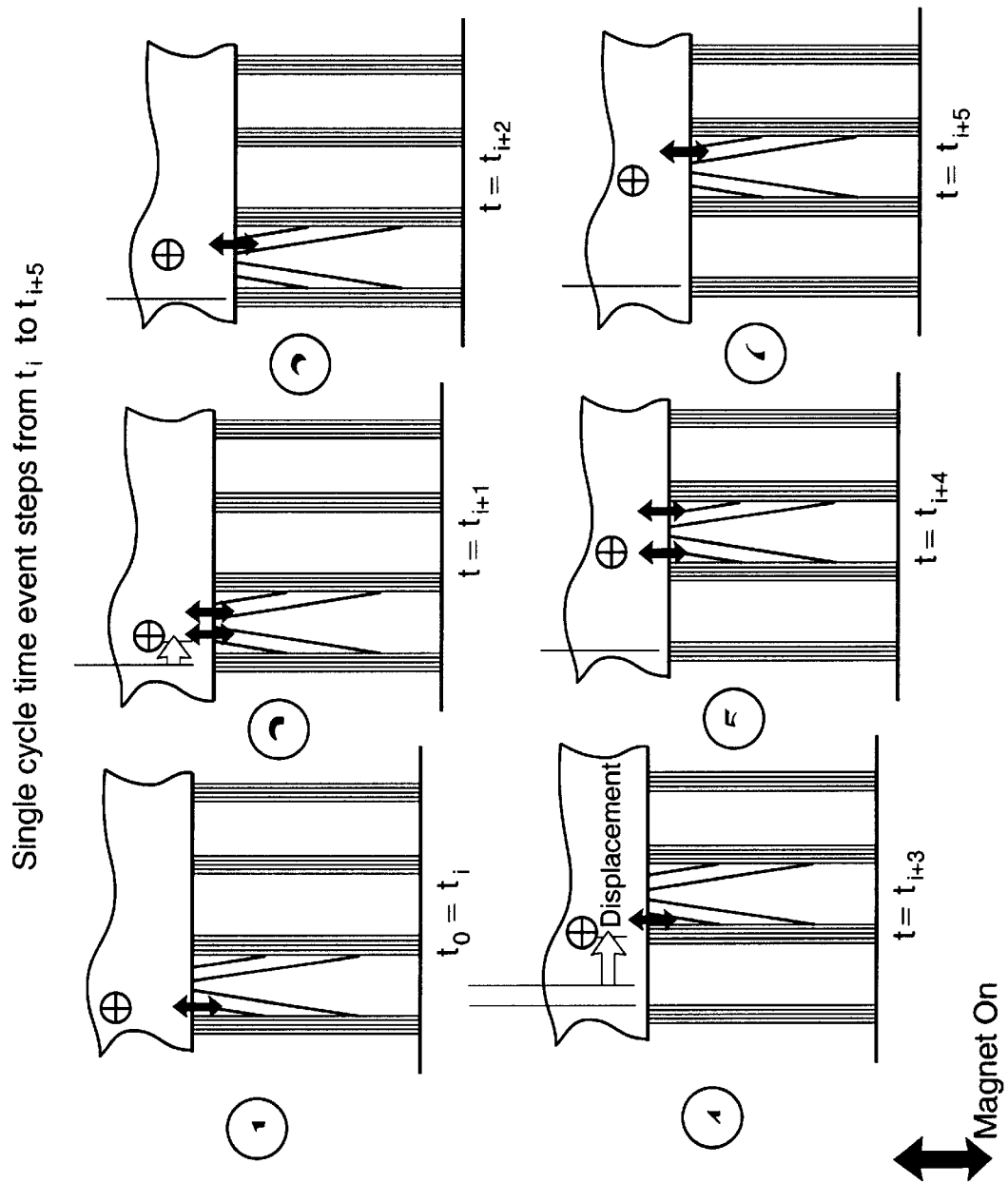
FIG. 17 illustrates the motion sequence of the cantilevered beams to effectuate movement of the SSC.

FIG. 17 depicts in detail how the SSC is actual moved across the SmDS area in micro-gravity. The element tip magnets are turned off and on (releasing and grabbing the SSC) in a sequential manner coordinated in time with the element maximum bending displacement position of the active cantilever elements. This provides a mechanism by which the elements hand off the SSC from one set to another. After each cycle as defined in FIG. 17 steps 1 through 6, the RSC checks the stability of the couple spacecraft and authorizes the next movement cycle.

At the maximum voltage (100 VDC), each element displaces typically 1 mm. The elements as designed using the space durable materials specified, are space qualified and conducive to low cost manufacturing. The elements are designed to be plugged into sockets on the SmDS base structure. Each socket provides electrical contacts and rigid mechanical support for the cantilever bending elements to react against.

Appendix A

Consider a one-dimensional analysis of a typical PZT unimorph attached to a structure. Assume perfect bonding of the electrodes with no added mass or stiffness. Using the local coordinate shown in FIG. A-1:

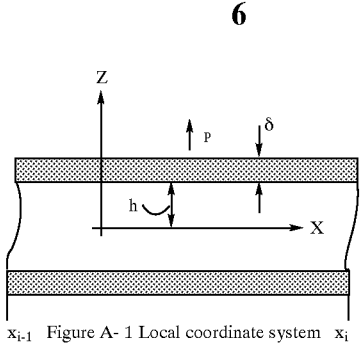

Figure A-1 Local coordinate system

From references A1 and A2 the following equations can be written, $$T_{11}(x,t) = C_{11}^D S_{11}(x,t) - H_{31} D_3(x,t) \quad (A\text{-}1)$$

$$E_3(x,t) = -H_{31} S_{11}(x,t) + (1/\epsilon_{33}^S) D_3(x,t) \quad (A\text{-}2)$$

Where, $\epsilon_{33}^S \equiv$ Dielectric constant @ constant strain [Farad/m]
$E_3 \equiv$ electric field between electrodes
$C_{11}^D \equiv$ elastic modulus (no field)
$e_{31} \equiv$ piezoelectric coefficient [C/m$^2$]
$\epsilon_{11} \equiv$ dielectric coefficient [Farad/m].
$T_{11} \equiv$ stress
$H_{31} \equiv e_{31}/\epsilon_{11}$
$D_3 \equiv$ charge per unit area
$S_{11} \equiv$ strain For a constant width unimorph, $$V_D(t) = E_3(t)\delta. \quad (A\text{-}3)$$

Where $\delta$ is the separation between the electrode plates. Furthermore, assume the strain at any point can be written as, $$S_{11}(x,t) = -z \partial^2 w / \partial x^2 (x,t). \quad (A\text{-}4)$$

When polarized in the z direction, the charge within the unimorph is, $$\partial D_3 / \partial z = 0 \therefore D_3(x,y,t).$$

Therefore equation (A-2) can be rewritten approximately as, $$V_D(t) = H_{31}(h\delta + \delta^2/2)(\partial^2 w/\partial x^2) + D_3(\delta/\epsilon_{33}^S) \quad (A\text{-}5)$$

Solving for $D_3$ in equation (A-5) yields, $$D_3(x,t) = (\epsilon_{33}^S/\delta)V_D(t) - ((H_{31}\epsilon_{33}^S)/\delta)(h\delta + \delta^2/2)(\partial^2 w/\partial x^2). \quad (A\text{-}6)$$

Equation (A-6) can be simplified to yield, $$D_3(x,t) = (\epsilon_{33}^S/\delta)V_D(t) - (e_{31}h)(\partial^2 w/\partial x^2) \quad (A\text{-}7)$$

since $\delta \ll h$ and $H_{31} = e_{31}/\epsilon_{11}^S$ and $\epsilon_{33}^S = \epsilon_{11}^S$ for the PZT used, substituting equation (A-6) into equation (A-1) yields, $$T_{11}(x,t) = -[C_{11}^D h - ((e_{31})^2 h)/\epsilon_{11}^S)](\partial^2 w/\partial x^2) - (e_{31}/\delta)V_D(t).$$

Which can be approximated as, $$T_{11}(x,t) = -(C_{11}{}^D h)(\partial^2 w/\partial x^2) - (e_{31}/\delta)V_D(t)$$

for $h < z < h+\delta$ and $-(h+\delta) < z < -h$. Given two unimorphs wired in a complimentary manner (the top actuator contracts as the bottom actuator expands), the moment at any point from $x_{i-1}$ to $x_i$ is equal to, $$M(x,t) = -(EI)(\partial^2 w/\partial x^2) - (2e_{31}'h)V_D(t) \quad (A\text{-}8)$$

where $e_{31}'$ is equal to $e_{31}$ times the width of the unimorph. Let $K_D = 2e_{31}'h$, equation (8) becomes, $$M(x,t) = -(EI)\partial^2 w/\partial x^2 - K_D V_D(t). \quad (A\text{-}9)$$

When no external forces are applied ie $(M(x,t)=0)$ equation (9) becomes, $$K_D V_D(t) = (EI)\partial^2 w/\partial x^2 \quad (A\text{-}10)$$

Or if we assume the unimorphs covers the entire length of the sensor/actuator element, the displacement along the element can be approximated as, $$w(x,t) = (K_D/EI)V_D(t)(x^2/2) \quad (A\text{-}11)$$

Given a DC voltage $V_D(t) = V_{DC}$, and an actuator element of length l, the tip displacement is, $$w(l) = (K_D/EI)(V_{DC})(l^2/2)$$

or, $$w(l) = [(e_{31}'h)(V_{DC})(l^2)]/(EI). \quad (A\text{-}12)$$

w(tip)=[$(e_{31})$(actuator width)(beam half thickness)(DC voltage)((beam unimorph length)$^2$)]/[(beam modulus)(beam cross sectional inertia)]

UNITS: $[m] = [(C/m^2)(m)(m)(m^2)((Nm)/C)]/[(N/m^2)(m^4)]$

Example Calculation

Actuator element cross sectional inertia of composite beam (approximately 2 h thick with a width of b) with actuators on two parallel surfaces, $$I = [(\text{width})(\text{thickness})^3]/12 = (2/3)(b)(h^3) \quad (A\text{-}13)$$

therefore, $$w(l) = [(3/2)(e_{31})(V_{DC})(\text{length})^2]/[(E)(h)^2]. \quad (A\text{-}14)$$

Using Piezoceramic type G-1195 PZT for the actuator shown in FIG. 4, the following is given $E_{PZT} = 6.3 \times 10^{10}$ N/m$^2$ = $6.43 \times 10^9$ kg/m$^2$ Capacitance for $(0.75 \times 0.75 \times 0.01$ inch$) = 2.2\text{E}{-08}$ C/V Capacitance for $(1.555 \times 0.6068 \times 0.01$ inch$) = 3.9\text{E}{-08}$ C/V $g_{31} = 1.14\text{E}{-02}$ Vm/N $d_{31} = 1.79\text{E}{-10}$ m/V or C/N $\epsilon_{33} = 1.65\text{E}{-08}$ Farad/m.

Therefore, $$e_{31} = d_{31}E_{PZT} = [1.79\text{E}{-10}\text{ C/N}][6.3\text{E}{+10}\text{ N/m}^2] = 11.277 \text{ (C/m}^2).$$

And if we let length (l) of an actuator be equal 10 cm or 0.1 m with a half-thickness (h) of 0.002 m, the displacement of the tip as a function of voltage is, $$w(\text{tip}) = [(3/2)(e_{31})(V_{DC})(\text{length})^2]/[(E_{BEAM})(\text{half-thickness})^2$$

or $$w(\text{tip}) = [(1.5)(11.277)(V_{DC})(0.01)]/[(E_{BEAM})(4.0\text{E}{-06})]$$

finally $$w(\text{tip}) = [4.228875\text{E}{+04}(V_{DC})]/[(E_{BEAM})]. \quad (A\text{-}15)$$

With equation (A-15) using G-1195 PZT unimorphs, we can design an equivalent modulus for the composite actuator beam element to achieve the desired tip displacement per given voltage.

It is probably impractical to have the unimorphs completely cover the two sides of the actuator element. There would a number of commercially available transducers wired in parallel on each surface as shown in FIG. 4.

For example, assume for the moment that the unimorphs only covered the surfaces by 80% add nothing to the beam modulus and the desired tip deflection was 1 mm for 100 volts DC. The equivalent modulus of a composite beam structure (10 cm long consisting of laminated fiber stiffened resin with complimentary wired unimorphs wired in a complimentary fashion) for sensor actuator would be as follows.

Using equation (A-15) with a 80% performance factor and solving for $E_{BEAM}$ (modulus), yields $w(\text{tip}) = [4.228875\text{E}{+04}(V_{DC})]/[(E_{BEAM}].$ $E_{BEAM} = [(0.8)(4.23\text{E}{+04})(100)]/(1.0\text{E}{-3})$ $E_{BEAM} = 3.38 \times 10^9$ kg/m$^2$ or $4.8 \times 10^6$ psi

What is claimed is:

1. In a micro gravity environment, a smart docking surface apparatus forming a flat surface of a first three-dimensional object for the precise manipulation of a second three-dimensional object having a ferro-magnetic surface, said smart docking surface apparatus comprising:

a plurality of identical cantilevered sensor/actuator beam elements attached to said first surface in a herringbone pattern with mutually perpendicular X and Y axes;

means for attaching to and detaching from said second object by said smart docking surface apparatus;

means for sensing the location of said second object on said smart docking surface apparatus once said second object is in contact with the smart docking surface apparatus;

means for determining the correct sequence of element movements required to reposition said second object to a desired position on said smart docking surface apparatus; and means for actuating said beam elements in said predetermined sequence to reposition said second object.

2. The smart docking surface apparatus of claim 1, wherein the means for sensing the location of said second object is eddy current sensors located on each beam element.

3. The smart docking surface apparatus of claim 1, wherein the means for determining the correct sequence of element movements required to reposition said second object to a desired position is a computer.

4. The smart docking surface apparatus of claim 1, wherein the means for actuating said beam elements are PZT unimorphs.

5. A method to facilitate the final docking sequence of a first receiving spacecraft (RSC) having a smart docking surface apparatus forming a flat surface on one side of said RSC and a second servicing spacecraft (SSC) having a ferro-magnetic docking surface once said ferro-magnetic docking surface of the SSC has made contact with said smart docking surface apparatus, composed of cantilevered sensor/actuator beam elements, of the RSC, the method comprising:

sensing the location of the SSC on the smart docking surface using eddy current sensors; calculating the required sequence of sensor/actuator beam element movements to correctly position the SSC on the smart docking surface; and activating said sensor/actuator beam elements to move and align the SSC to the desired location.

* * * * *